Jan. 8, 1957

G. W. SHADWICK 2,776,754

CENTRIFUGAL FILTER

Filed March 26, 1954

INVENTOR
George W. Shadwick

BY Cushman, Darby & Cushman
ATTORNEYS

Jan. 8, 1957   G. W. SHADWICK   2,776,754
CENTRIFUGAL FILTER
Filed March 26, 1954   2 Sheets-Sheet 2
FIG. 4.
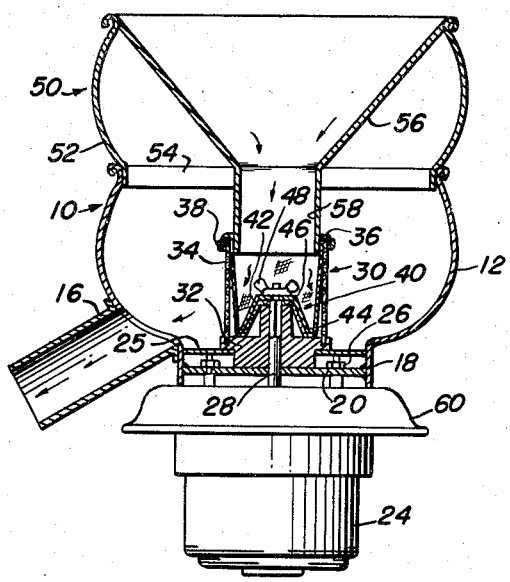
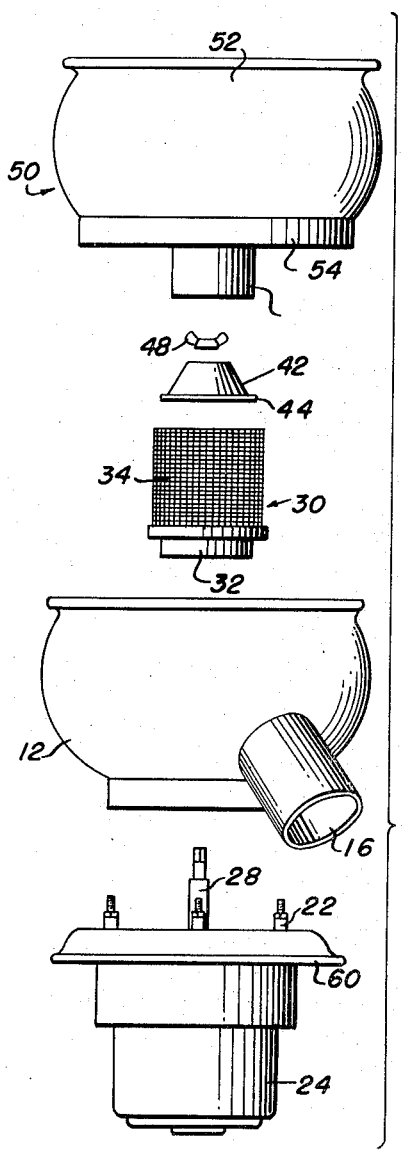
FIG. 5.
INVENTOR
George W. Shadwick
BY Cushman, Darby & Cushman
ATTORNEYS

United States Patent Office 2,776,754
Patented Jan. 8, 1957

2,776,754

CENTRIFUGAL FILTER

George W. Shadwick, Crete, Ill., assignor to Beatrice Foods Co., Chicago, Ill., a corporation of Delaware Application March 26, 1954, Serial No. 418,869

2 Claims. (Cl. 210—72)

The present invention relates to filters and more particularly to a power-driven rotary centrifugal filter.

The invention has for its primary purpose the provision of a centrifugal filter which is particularly adapted for dairy use in filtering milk and the like and for cream sediment testing.

Another object of the invention is to provide a centrifugal filter which is composed of relatively few, inexpensive parts which may be easily disassembled for cleaning purposes, when necessary.

A further object of the invention is the provision of a centrifugal filter which provides a closed receptacle to receive the filtered milk or the like so as to meet the rigorous sanitary requirements of dairy use.

Another object of the invention is to provide a centrifugal filter which is adapted to be supported by a conventional milk can and to deliver filtered fluid into the top of a milk can adjacent the supporting milk can.

Still another object of the invention is to provide a dairy filter which will rapidly filter dairy products such as milk, cream and the like by centrifugal power and yet provide ample filtering effect for such fluids.

These and other objects of the present invention will become apparent during the course of the following specification and claims.

The invention may best be understood with reference to the accompanying drawings wherein one embodiment of the present invention is illustrated.

In the drawings:

Figure 4 is a cross-sectional view taken along the line 4—4 of Figure 1, and

Figure 5 is an exploded view showing the various component parts of the filter.

Figure 1:
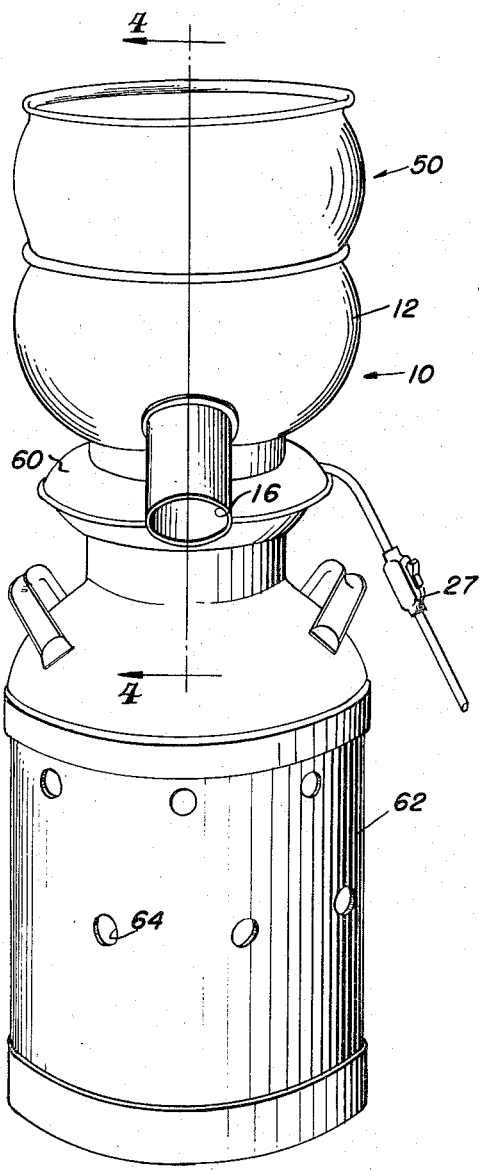
Figure 1 is a perspective view showing the present invention supported by a conventional milk can.
Figure 2:
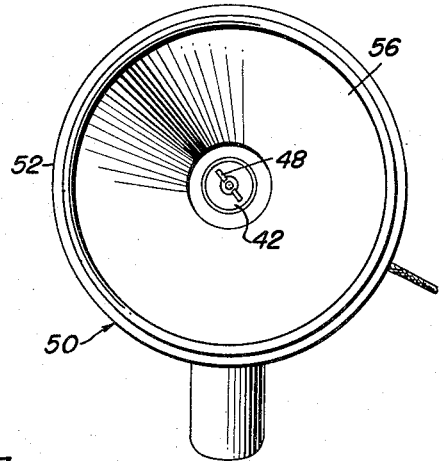
Figure 2 is a top plan view of the centrifugal filter of the present invention.
Figure 3:
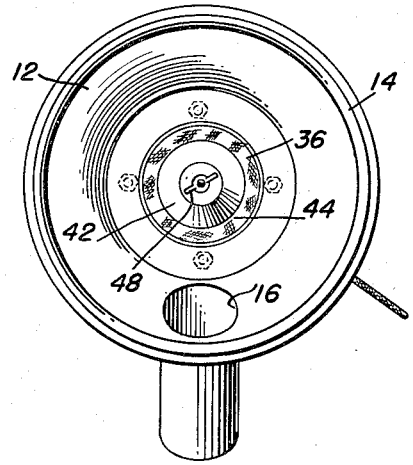
Figure 3 is a top plan view with the funnel member of the filter removed.

Referring now to the drawings, the numeral 10 indicates generally a centrifugal filter embodying the present invention. The filter 10 comprises a bowl 12 which is open at its top portion as indicated at 14. A discharge spout or outlet 16 is provided in the lower portion of the bowl. The lower portion of the bowl 12 is also provided with a plate 18 which is suitably apertured as at 20 to receive co-operating studs 22 extending from an electric motor 24. The motor 24 is mounted vertically beneath bowl 12 by engaging the studs 22 into the apertures 20 of the plate 18 and securing studs 22 to the plate 18 by suitable nuts 26. If desired, a suitably apertured bottom plate 25 may be positioned in the bottom of the bowl to prevent the filtered liquid from coming into contact with the studs and nuts. The electric motor 24 controlled by a hand switch 27 is provided with the usual drive shaft 28 which extends upwardly through the plate 18 into the central portion of the bowl 12.

The shaft 28 has non-rotatably mounted thereon a cup-shaped filter basket indicated generally at 30. The filter basket includes a circular base member 32 which is mounted concentrically on the shaft 28, and a substantially cylindrical screen member 34, the lower end of which is embedded in the base member 32. The lower end of the base member 32 may be recessed to fit within a co-operating aperture in the plate 25, as can be clearly seen in Figure 4. The screen member preferably is made of a metal which is highly polished such as nickel, stainless steel, chromium and the like, however, it will be understood that other materials may be utilized.

A filter bag 36 is disposed within the filter basket 30 and is shaped to conform to the inside configuration of the filter basket. The filter bag may be made of any suitable material such as cloth, paper and the like. However, for use in dairies it is preferable to utilize a material which is resistant to butter fat and is non-absorbent. Consequently, it has been found that 26 mesh nylon gives excellent results for this particular use. The upper end of the filter bag 36 preferably is provided with an elastic band 38 which fits on the outer periphery of the upper end of the screen 34. The upper rim of the screen may be plastic coated to prevent any cutting of the sleeve filter when the same is in its operating position. A securing means generally indicated at 40 is provided to secure the filter basket 30 to the shaft 28 and to secure the lower end of the filter bag 36 in the filter basket 30. As shown, the securing means 40 comprises a generally conical shaped element 42 having a lower circular flange 44 adapted to engage the lower end of the filter bag 36 inside the filter basket 30. The upper end of the conical element 42 is flattened at 46 and provided with a suitable aperture for mounting the element concentrically on the shaft 28. A wing nut 48 is threadedly engaged with the upper end of the shaft 28 and when tightened on the shaft secures the basket 39 to the shaft and the lower end of the filter bag to the base 32.

A funnel member 50 has a bowl portion 52 provided with a circular flange 54 which is adapted to engage the open top 14 of the bowl 12. Disposed within the bowl portion 52 is a funnel 56 having an upper end rigidly secured to the upper end of the bowl portion 52 and having a lower discharge opening 58 which when the filter is assembled leads into the filter bag 36.

Mounted on the electric motor 24 and disposed between the motor and the bottom portion of the bowl 12 is a fitting 60 which is lid-like in configuration, conforming to the general shape of a conventional milk can lid. The purpose of the fitting 60 is to permit the filter 10 to be easily mounted in the top of a conventional milk can, such as can 62 illustrated in Figure 1. In this manner it is unnecessary to provide an integral support for the filter 10 since for the use to which it is particularly adapted such milk cans are readily available. However, it is contemplated that conventional milk cans provided with suitable apertures 64 to provide ample air venting for the motor 24 may be provided as part of the filter 10.

In utilizing the filter 10 for dairying for which it is particularly adapted, cream or other dairy product is pored into the funnel 56 where it is directed through the opening 58 into the filter bag 36. The motor 24 drives the filter basket 30, together with the filter bag 36, at a relatively high rate of speed so that the cream entering the filter bag is centrifugally thrown outwardly through the filter bag and basket, thereby filtering the cream. The cream thus thrown through the filter bag and screen is collected in the bowl 12 from where it will flow out of the discharge outlet 16 into an adjacent milk can. It is important to note that the discharge outlet is of a construction which will direct the cream into the top of a second conventional milk can held adjacent to the conventional milk can 62 utilized to support the filter.

It is also to be noted that by virtue of the bowl portion 52 fitting in the opening 14 of the bowl 12, there is provided a closed receptacle to receive the cream after filtering, thus maintaining a highly sanitary receptacle for the filtered cream. It can be readily understood that sanitary considerations are extremely important when handling cream or like dairy products which are to be sold for human consumption.

Another salient feature of the present invention is the ease and simplicity with which the relatively few parts of the filter may be disassembled and reassembled for cleaning and/or changing the filter bag. To disassemble the parts to change filter bags and for cleaning after use, the funnel member 50 is first removed from its engagement with the open top of the bowl 12 thereby exposing the wing nut 48 on shaft 28. Removal of the wing nut 48 permits the filter basket 30, together with the filter bag 36 and element 42, to be pulled off the shaft. The parts are thus separated and ready for individual cleaning. To reassemble the filter, the above procedure is reversed. The significant feature of the filter assembly is that the wing nut 48 is the only fastening element that need be loosened to separate the parts, and loosening of the nut 48 may be easily accomplished by hand without the use of tools.

It is to be understood, however, that the form of the invention herewith shown and described is to be taken as the preferred embodiment and that various changes may be made without departing from the spirit of the invention or the scope of the appended claims.

I claim:

1. A centrifugal filter comprising a bowl having an opening in its top portion and a discharge outlet in its bottom portion, a vertical shaft disposed in the central portion of said bowl, means for rotating said shaft, a filter basket mounted on said shaft including a vertical screen concentric with said shaft, a filter bag detachably secured at its upper end to the upper end of said screen, and means mounted on said shaft for securing the lower end of said filter bag to said basket and said basket to said shaft.

2. A centrifugal filter as defined in claim 1 wherein said bowl is provided with a fitting suitable for mounting said filter in the top of a conventional milk can whereby said filter may be supported by said milk can, and wherein said discharge outlet is disposed to discharge filtered fluid into a second conventional milk can positioned adjacent said first-mentioned milk can.

References Cited in the file of this patent

UNITED STATES PATENTS

| | | |
|---|---|---|
| 554,848 | Glascock | Aug. 20, 1895 |
| 950,211 | Reymore et al. | Feb. 22, 1910 |
| 1,015,946 | Ebner | Jan. 30, 1912 |
| 2,106,832 | Dansfeld | Feb. 1, 1938 |
| 2,295,922 | Weston | Sept. 15, 1942 |
| 2,343,694 | Mitchum | Mar. 7, 1944 |

FOREIGN PATENTS

| | | |
|---|---|---|
| 6,306 | Great Britain | of 1895 |
| 551,771 | Germany | May 5, 1931 |